(12) United States Patent
Hung et al.

(10) Patent No.: US 10,432,052 B2
(45) Date of Patent: Oct. 1, 2019

(54) SIDE WINDING MOTOR STATOR AND MANUFACTURING METHOD THEREOF

(71) Applicant: TECO Electric & Machinery Co., Ltd., Taipei (TW)

(72) Inventors: Lian-Shin Hung, Taipei (TW); Ching-Chih Huang, Taipei (TW); Shu-Wei Lin, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 931 days.

(21) Appl. No.: 14/808,718

(22) Filed: Jul. 24, 2015

(65) Prior Publication Data
US 2016/0365764 A1 Dec. 15, 2016

(30) Foreign Application Priority Data
Jun. 12, 2015 (TW) .............................. 104119163 A (51) Int. Cl.
*H02K 3/28* (2006.01)
*H02K 3/18* (2006.01)
*H02K 3/52* (2006.01)

(52) U.S. Cl.
CPC .............. *H02K 3/18* (2013.01); *H02K 3/522* (2013.01); *H02K 2203/09* (2013.01); *H02K 2203/12* (2013.01)

(58) Field of Classification Search
CPC .. H02K 3/18; H02K 3/28; H02K 5/08; H02K 15/022; H02K 15/06; H02K 11/00; H02K 3/522; H02K 2203/09; H02K 13/00; H02K 5/16; H02K 9/00; H02K 15/10; H02K 3/38; H02K 3/47; H02K 3/46; H02K 3/52; H02K 3/34
USPC .................................. 310/71, 194, 214–215
See application file for complete search history.

(56) References Cited

U.S. PATENT DOCUMENTS

| | | | |
|---|---|---|---|
| 7,164,217 B2* | 1/2007 | Kabasawa | H02K 3/522 310/260 |
| 8,847,457 B2* | 9/2014 | Yoshida | H02K 3/522 29/596 |
| 2008/0157610 A1* | 7/2008 | Watanabe | H02K 3/522 310/43 |
| 2009/0256439 A1* | 10/2009 | Inoue | H02K 3/522 310/71 |
| 2013/0234549 A1* | 9/2013 | Egami | H02K 3/28 310/71 |

* cited by examiner

Primary Examiner — Mang Tin Bik Lian
Assistant Examiner — Leda T Pham
(74) Attorney, Agent, or Firm — Muncy, Geissler, Olds & Lowe, P.C.

(57) ABSTRACT

A side winding motor stator includes a plurality of stator structures, a plurality of winding structures and a plurality of winding rolls. The stator structures are assembled to form a stator module. Each of the stator structures includes a stator tooth and an insulated frame. The stator tooth is configured into the insulated frame. The insulated frame has a gap. The winding structures, each of which has a plurality of lateral slots, are engaged through the gap. The winding rolls are engaged in the lateral slots.

4 Claims, 10 Drawing Sheets

SIDE WINDING MOTOR STATOR AND MANUFACTURING METHOD THEREOF

This application claims the benefit of Taiwan Patent Application Serial No. 104119163, filed Jun. 12, 2015, the subject matter of which is incorporated herein by reference.

BACKGROUND OF INVENTION

1. Field of the Invention

The invention relates to a motor stator, and more particularly to a side winding motor stator that utilizes lateral slots to position winding rolls and to further integrate winding structures into the stator structures.

2. Description of the Prior Art

In the era of technology booming, the industry of electrical motors is definitely one of the core industries. The motor is an electric device that can transform electric energy into kinetic energy. Since 1740 when a prototype motor was introduced, many efforts have been made to improve the motor, in motor's transformation efficiency, also in power and in operational stability. Considering current needs from the industries, important issues include at least a topic of reducing the factory occupation. In this manifold, the modern motor, due to its winding, can contribute nothing to reduce its own volume. Then, the neighboring space along the axial direction of the motor cannot be well implemented. In addition, since the manufacturing in winding of the modern motor is complicated, the usage of the copper lines can't be further minimized, thus the gross weight of the motor is hard to be reduced, and hence the operational convenience for the modern motor is never achieved.

Figure 1:
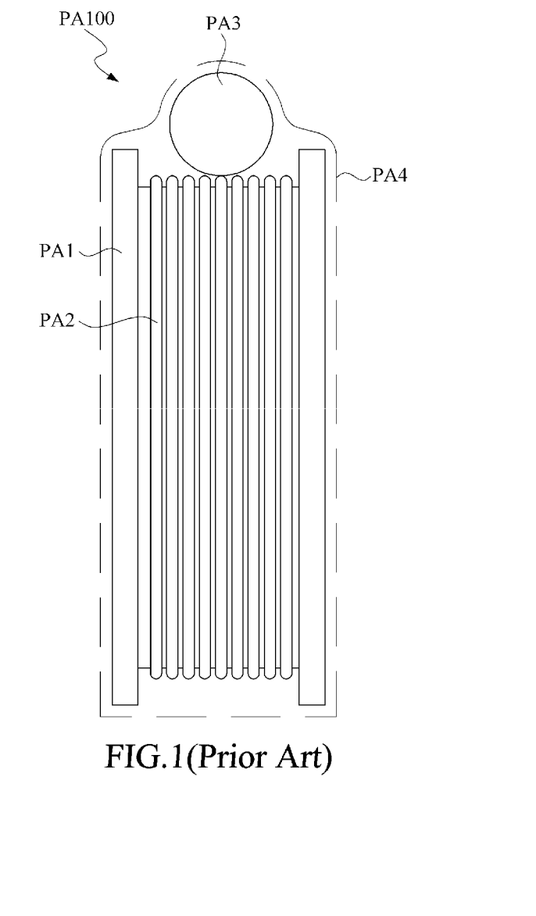
FIG. 1 is a schematic view of a conventional motor stator structure.

Referring now to FIG. 1, a conventional motor stator structure is schematically shown. The motor stator structure PA100 includes a winding insulated frame PA1, a plurality winding coils PA2, a winding connection PA3 and an insulation membrane PA4. The winding insulated frame PA1 is formed by wrapping over a stator tooth (not shown in the figure). The winding coils PA2 are wound around the winding insulated frame PAL The winding connection PA3 is located above the winding insulated frame PA1. The insulation membrane PA4 is to cover entirely the winding insulated frame PA1, the winding coils PA2 and the winding connection PA3. Since the motor stator is formed by integrating a plurality of motor stator structures PA100 and the winding coils PA2 for these motor stator structures PA100 are usually separated into different phases, so winding coils PA2 corresponding to different phases would be connected to different conductive coils, such that the motor can be rotated by the force induced from the different-phase structures.

Therefore, in the current art, since the winding formation of the winding coils PA2 and the conductive coils are all manmade. Thus, ill winding may occurs frequently and inevitably. Also, since the manmade winding is time-consuming, the cost in labors is usually high and hard to be reduced. In addition, since the winding connection PA3 is usually formed on top of the winding insulated frame PA1, so the space occupied by the entire motor system is increased, and thus the minimizing the volume of the motor is made to be infeasible. Further, as the entire winding coils PA2 and winding connection PA3 shall be sealed by the insulation membrane PA4, and since the occupation of the winding connection PA3 is big, the usage of the insulation glue for forming the insulation membrane PA4 could be significant, and thus would increase the total weight of the motor.

SUMMARY OF THE INVENTION

In the prior art, interior winding structure of the motor is so complicated, and thus the volume of the motor is hard to be reduced. Further, since the complicated operation in forming the winding would lead to huge labor work and enormous labor time, thus it is a primary object of the present invention to provide a side winding motor stator that applies several winding structures to position a plurality of winding rolls and further assembles these winding rolls into a stator module, such that the volume and the weight of the motor can be effectively reduced, and the manufacturing process thereof can be substantially simplified.

Accordingly, in the present invention, the side winding motor stator includes a plurality of stator structures, a plurality of winding structures and a plurality of winding rolls. The stator structures are engaged side by side to form a stator module, and each of the stator structures further includes a stator tooth and an insulated frame, where the insulated frame further has a gap. The insulated frame is to sleeve over the stator tooth. The winding structure engaged with the gap further has a plurality of lateral slots parallel arranged in an axial direction. The winding rolls are fixed into the corresponding lateral slots.

In one embodiment of the present invention, the stator tooth further has a winding portion, the stator structure further includes a winding coil wound around the winding portion, and the winding coil of the stator structure electrically couples the corresponding winding roll.

In one embodiment of the present invention, the winding roll further has a coupling portion for electrically coupling the corresponding winding coil.

In one embodiment of the present invention, the insulated frame further includes an extension frame to construct the gap.

In one embodiment of the present invention, the insulated frame further includes a sleeve portion, an inner frame and an outer frame, the sleeve portion covering the winding portion, the winding coil winding the sleeve portion so as to wind around the winding portion, the inner frame and the outer frame being located to opposing ends of the sleeve portion, the extension frame being extended from the outer frame.

In one embodiment of the present invention, the outer frame further has at least one coil positioning aperture, the winding coil electrically coupling the winding roll via the coil positioning aperture.

In one embodiment of the present invention, the winding structure further includes a slot assembly, an alignment portion and a position portion, the slot assembly contacting at one side of the gap and having the lateral slots, the alignment portion integrally formed to the slot assembly for engaging the gap by buckling, the position portion being further integrally formed to the alignment portion and contacting at another side of the gap by opposing to the slot assembly.

To manufacture the side winding motor stator set forth as a whole in accordance with the present invention, a manufacturing method of the side winding motor stator as described above comprises the following steps of: (a) preparing a plurality of stator teeth; (b) applying an injection-molding process to form a plurality of insulated frames respectively onto the plurality of corresponding stator teeth so as to generate a plurality of stator structures, each of which being consisted of one said insulated frame and one said stator tooth; (c) engaging side by side the plurality of stator structures so as to form a stator module; (d) preparing a plurality of winding structures; (e) buckling a plurality of winding rolls into a plurality of respective lateral slots of the plurality of winding structures; and (f) buckling the plurality of winding structures with at least one gap of the plurality of insulated frames.

In one embodiment of the present invention, after the step (b), a step (b1) of winding a plurality of winding coils onto the plurality of stator structures is further included.

As described above, in the present invention, since a plurality of the winding structures is introduced to position a plurality of the winding rolls, and both the winding structures and the winding rolls are integrally fixed to the stator structures, the winding rolls can be orderly arranged at the stator structures so as to effectively reduce the axial height of the motor stator, to minimize the volume of the winding rolls, and thus to simplify the manufacturing process. In addition, since the winding rolls are mounted onto the insulated frame in a well-arranged manner, the usage of the insulation glue can be greatly reduced, and thus the gross weight of the entire motor stator can be substantially lowered. The side winding motor stator and the manufacturing method thereof provided by the present invention can substantially improve, by reduction, the axial height of the motor stator, can save the time for winding, and can resolve the problems in the usage of the insulation glue as well as the weight of the stator.

All these objects are achieved by the side winding motor stator and the manufacturing method of the same described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a side winding motor stator and a manufacturing method of the same. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 2:
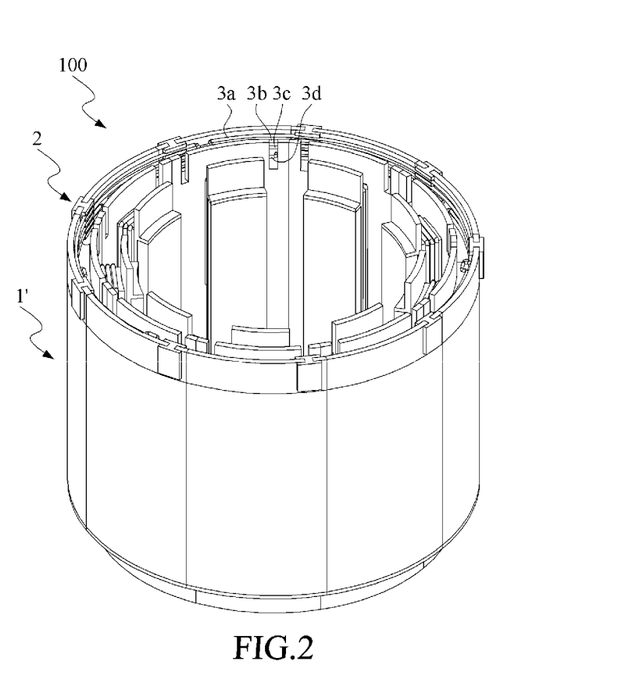
FIG. 2 is a schematic perspective view of a preferred side winding motor stator in accordance with the present invention.

Refer now to FIG. 2, in which a schematic perspective view of a preferred side winding motor stator in accordance with the present invention is shown. The side winding motor stator 100 includes a plurality of stator structures 1, a plurality of winding structures 2 and a plurality of winding rolls 3.

Figure 3:
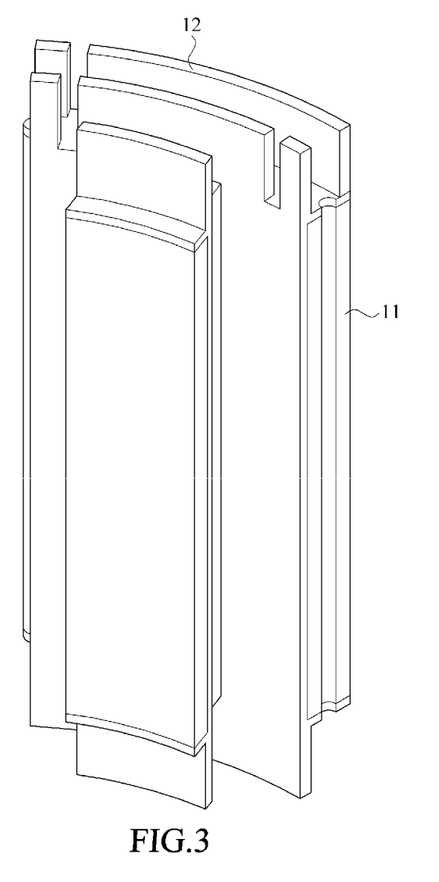
FIG. 3 is a schematic perspective view of the stator tooth and the insulated frame of FIG. 2.
Figure 4:
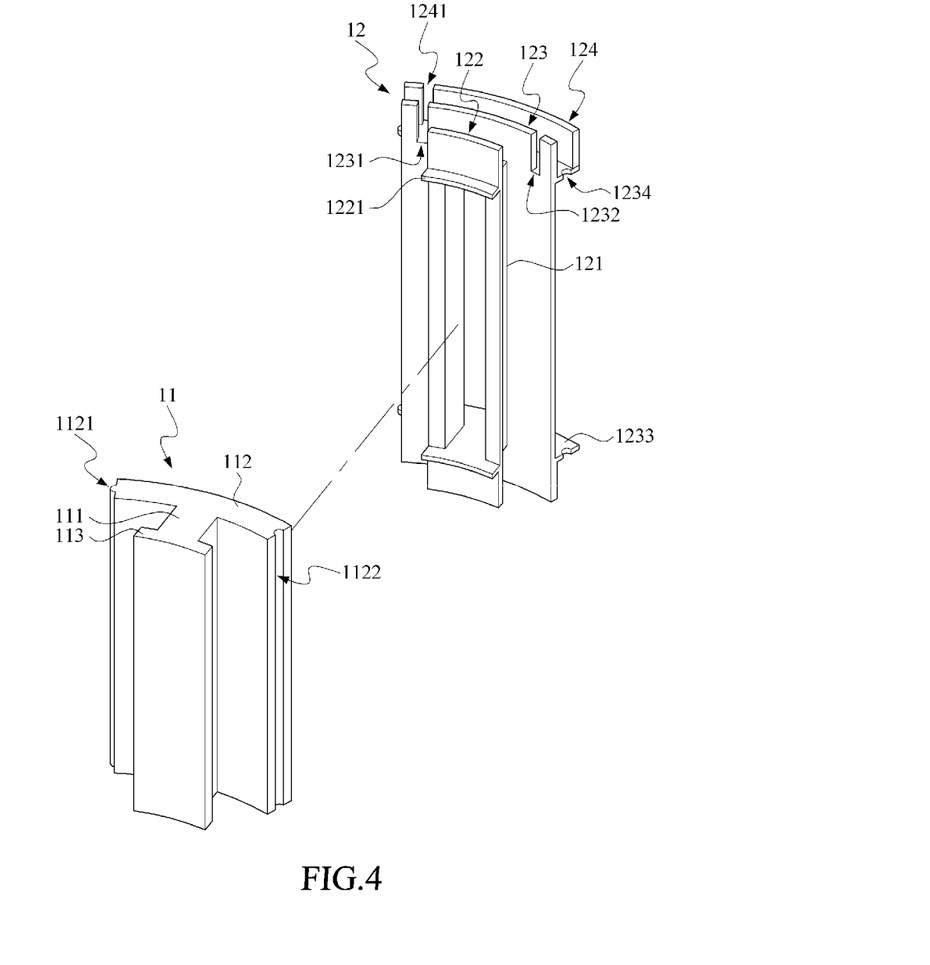
FIG. 4 is an exploded view of FIG. 3.
Figure 5:
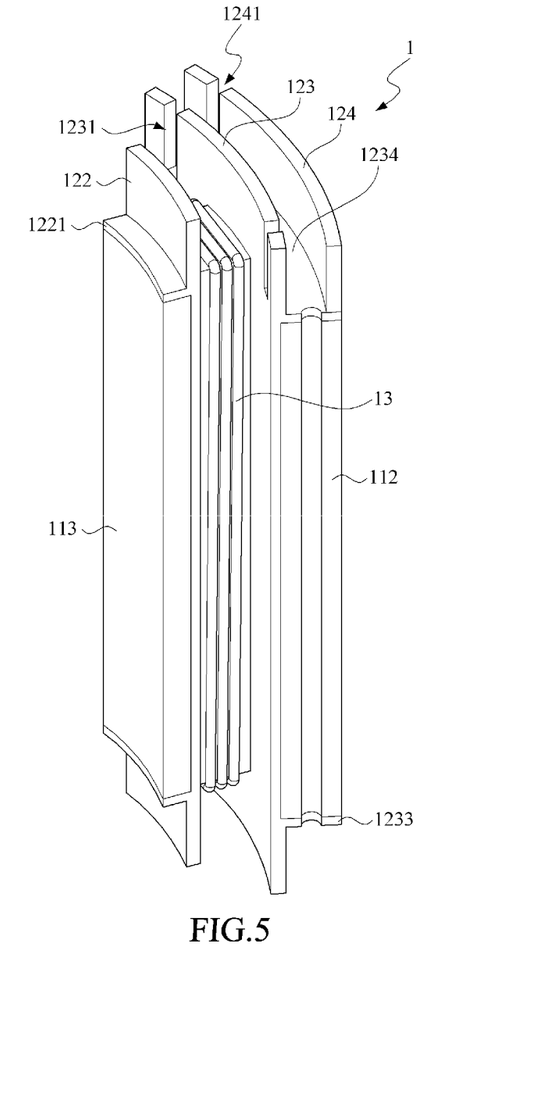
FIG. 5 is a schematic perspective view of the stator structure of FIG. 2.

Refer now to FIG. 3, FIG. 4 and FIG. 5, in which FIG. 3 is a schematic perspective view of the stator tooth and the insulated frame of the preferred side winding motor stator shown in FIG. 2, FIG. 4 is an exploded view of FIG. 3, and FIG. 5 is a schematic perspective view of the stator structure of FIG. 2. On the other hand, the manufacturing method of the side winding motor stator 100 in accordance with the present invention is firstly to prepare a plurality of stator teeth 11 (one shown in FIG. 3, FIG. 4 and FIG. 5). Each of the stator teeth 11 includes a winding portion 111, an annular split portion 112 and an annular split stop portion 113. The winding portion 111 is for winding up the corresponding winding coil 13. The annular split portion 112 and the annular split stop portion 113 are preferably to be formed as a unique piece, and are protruded from opposing ends of the winding portion 111, respectively. The annular split portion 112 has a first junction structure 1121 and a second junction structure 1122 for engaging the annular split portion 112 of another stator tooth 11. The annular split stop portion 113 is to perform as a stop (or constraint) of the winding coil 13 wound around the winding portion 111.

Then, an injection-molding process is introduced to engage individually a plurality of insulated frame 12 (one shown in FIG. 3, FIG. 4 and FIG. 5) to the respective stator teeth 11, and further to wind a plurality of winding coils 13 (one labeled in the figure) onto the respective insulated frames 12. Upon such an arrangement, a plurality of stator structures 1, each of which is consisted of one stator tooth 11, one insulated frame 12 and plural winding coils 13, are formed. In particular, the insulated frame 12 includes a sleeve portion 121, an inner frame 122, an outer frame 123 and an extension frame 124. The sleeve portion 121 is to allow the winding portion 111 to penetrate, and thus the winding coils 13 can wind the winding portion 111 through winding the sleeve portion 121. The inner frame 122 and the outer frame 123 are located to opposing ends of the sleeve portion 121. The inner frame 122 further includes two first positioning portions 1221 symmetrically constructed thereto (one labeled in the figure), in which the two first positioning portions 1221 are to tightly clamp the opposing ends of the annular split stop portion 113. The outer frame 123 has two coil positioning apertures 1231 and 1232 for positioning respective ends of the winding coils 13. The outer frame 123 further includes two symmetric-mounted second positioning portions 1233 and 1234 for tightly clamping the opposing ends of the annular split portion 112. The extension frame 124 having a gap thereof is integrally formed as a unique piece to the second positioning portion 1234.

Figure 6:
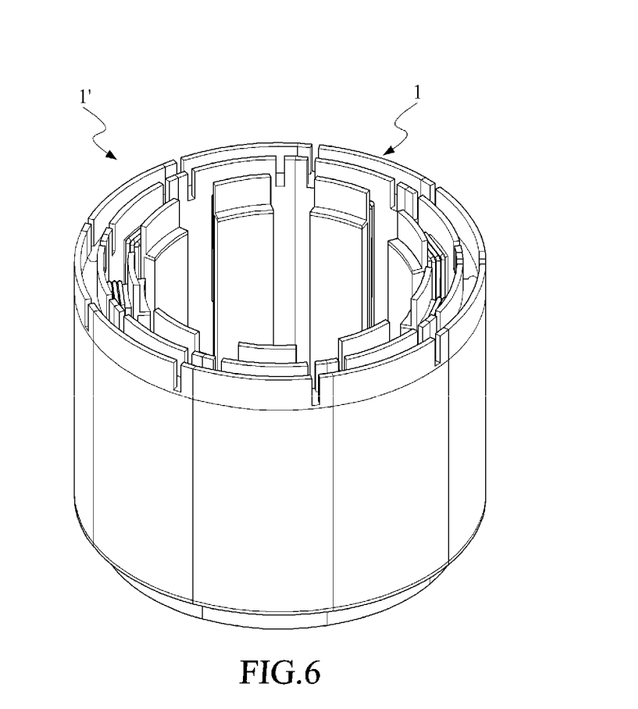
FIG. 6 is a schematic perspective view of the stator module of FIG. 2.

Referring now to FIG. 6, a schematic perspective view of the stator module of FIG. 2 is shown. Then, plural stator structures 1 as being formed as above are engaged side by side to form a stator module 1', in which the engagement between two neighboring stator structures 1 are achieved by connecting the annular split portions 112 of the two stator teeth 11.

Figure 7:
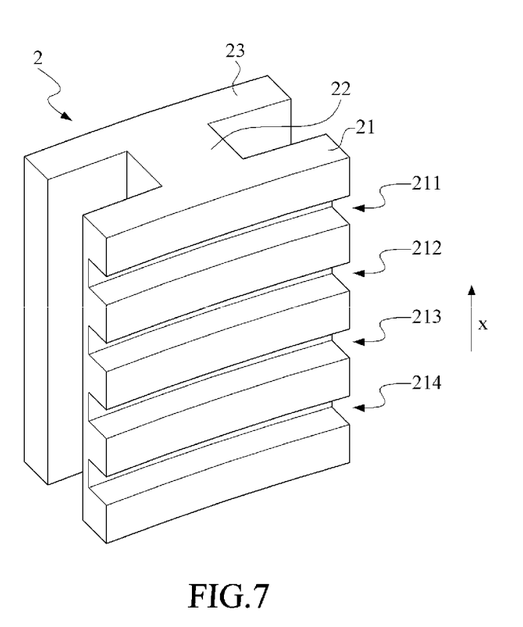
FIG. 7 is a schematic perspective view of the structure of FIG. 2.
Figure 8:
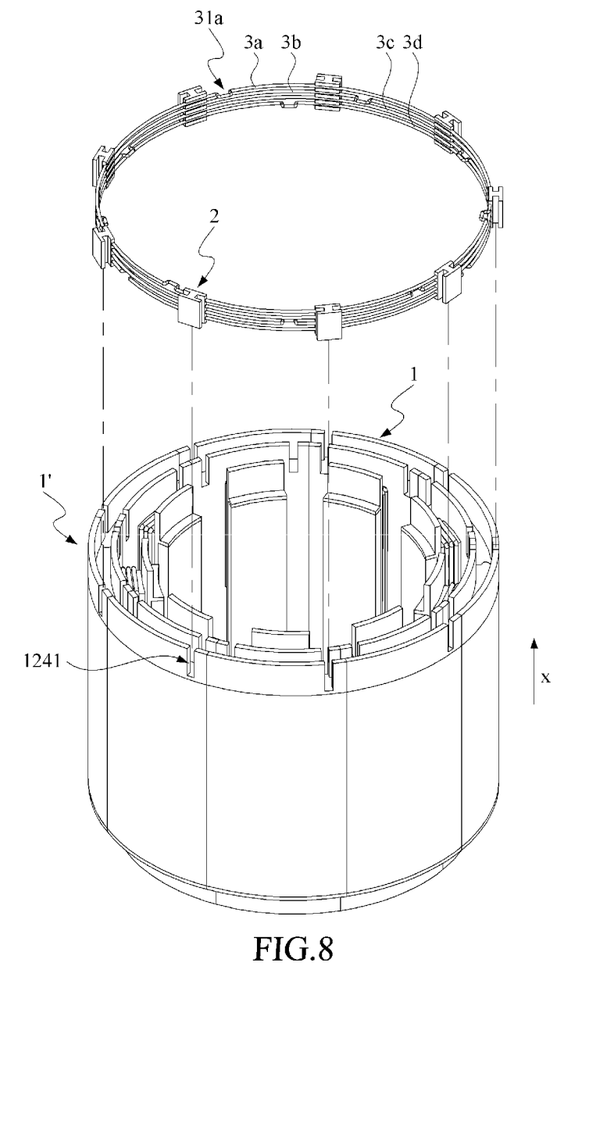
FIG. 8 is an exploded view of FIG. 2.

Refer now to FIG. 7 and FIG. 8, in which FIG. 7 is a schematic perspective view of the structure of FIG. 2, and FIG. 8 is an exploded view of FIG. 2. As shown, then, a plurality of winding structures 2 is prepared, in which each of the winding structures 2 includes a slot assembly 21, an alignment portion 22 and a position portion 23. The slot assembly 21 is to contact a side of the gap 1241, and, as illustrated, has four lateral slots 211, 212, 213 and 214 parallel arranged in an axial direction X. The alignment portion 22 is integrally formed to the slot assembly 21 as a unique piece and is to engage with the respective gap 1241 by inserting. The position portion 23 is further formed integrally as a unique piece to the alignment portion 22 and is to contact tightly the corresponding side (outer side) of the extension frame 124 by opposing to the slot assembly 21 (i.e., by crossing the gap 1241).

Thereafter, four winding rolls 3a, 3b, 3c and 3d are arranged to fit into the four lateral slots 211, 212, 213 and 214 of the winding structure 2, respectively.

Then, a plurality of the winding structures 2, each of which includes the four winding rolls 3a, 3b, 3c and 3d, are to buckle respective gaps 1241 of the insulated frames 12, such that the winding rolls 3a, 3b, 3c and 3d can be fixed to the corresponding stator structure 1 through the engagement with the gap 1241 of the insulated frame 12. Thereby, the side winding motor stator 100 of FIG. 2 can be formed.

Finally, the winding coils 13 are electrically coupled with the corresponding winding rolls 3a, 3b, 3c and 3d. As long as the winding rolls 3a, 3b, 3c and 3d are fixed to the stator structure 1, the user can electrically couple the winding coils 13 with the corresponding winding rolls 3a, 3b, 3c and 3d through the coil positioning aperture 1231. For example, the winding rolls 3a has a plurality of coupling portion 31 (one labeled in the figure), and one end of the corresponding winding coil 13 is electrically coupled to the coupling portion 31a via the coil positioning aperture 1231. Typically, the electrical coupling between the winding coil 13 and the coupling portion 31a can be achieved by welding or the like. Similarly, the winding rolls 3b, 3c and 3d can have their own coupling portions (not labeled in the figure) to electrically couple with the respective winding coils 13.

Figure 9:
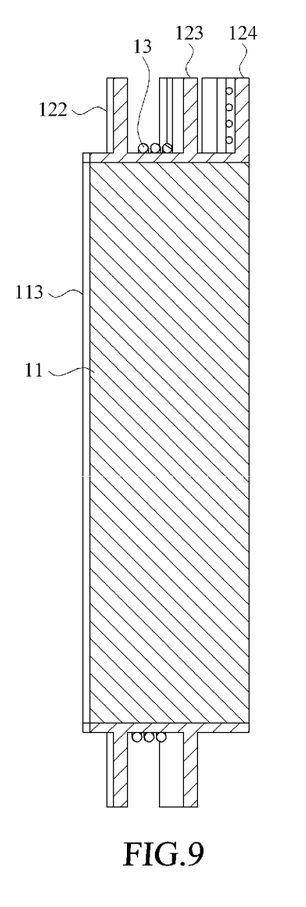
FIG. 9 is a schematic cross-sectional view of FIG. 2.
Figure 10:
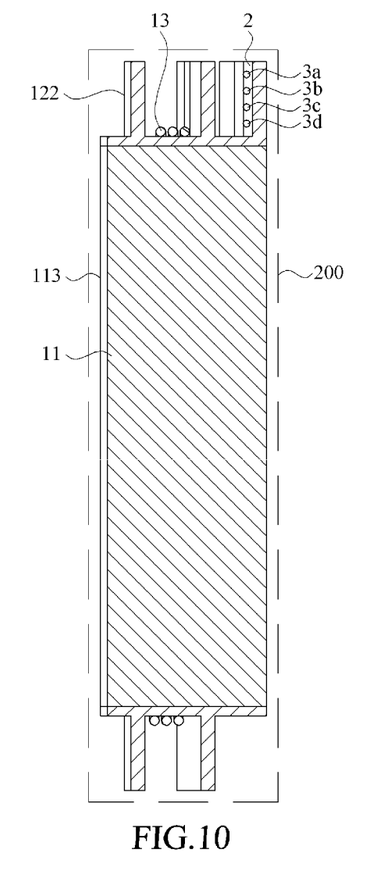
FIG. 10 is a schematic view of FIG. 9 after a glue-dispensing process.

Refer now to FIG. 9 and FIG. 10, in which FIG. 9 is a schematic cross-sectional view of FIG. 2, and FIG. 10 is a schematic view of FIG. 9 after a glue-dispensing process. As shown, after the entire side winding motor stator 100 is built, the user can introduce a glue-dispensing process to form an insulation membrane 200 made of the insulation glue over the winding coils 13 and the winding rolls 3a, 3b, 3c and 3d, such that possible shortcut from overheat in the winding coils 13 and the winding rolls 3a, 3b, 3c and 3d can be avoided. In addition, since the winding rolls 3a, 3b, 3c and 3d are orderly arranged on the extension frame 124, the usage of the insulation glue for coating can be reduced, and thereby the total weight of the side winding motor stator 100 can be also substantially lowered.

As described above, in the present invention, since a plurality of the winding structures is introduced to position a plurality of the winding rolls, and both the winding structures and the winding rolls are integrally fixed to the stator structures, the winding rolls can be orderly arranged at the stator structures so as to effectively reduce the axial height of the motor stator, to minimize the volume of the winding rolls, and thus to simplify the manufacturing process. In addition, since the winding rolls are mounted onto the insulated frame in a well-arranged manner, the usage of the insulation glue can be greatly reduced, and thus the gross weight of the entire motor stator can be substantially lowered. By comparing with the prior art that the winding on the insulated frame is manually performed, the side winding motor stator and the manufacturing method thereof provided by the present invention can substantially improve, by reduction, the axial height of the motor stator, can save the time for winding, and can resolve the problems in the usage of the insulation glue as well as the weight of the stator.

While the present invention has been particularly shown and described with reference to a preferred embodiment, it will be understood by those skilled in the art that various changes in form and detail may be without departing from the spirit and scope of the present invention.

What is claimed is:

1. A side winding motor stator, comprising:
a plurality of stator structures, engaged side by side to form a stator module, each of the stator structures further comprising:
a stator tooth; and
an insulated frame, sleeving the stator tooth, further including a sleeve portion, an inner frame, an outer frame and an extension frame integrated as a unique piece, the inner frame and the outer frame being located to opposing ends of the sleeve portion, the extension frame being extended from the outer frame and having a gap;
a plurality of winding structures, each of the plurality of winding structures further including a slot assembly, an alignment portion and a position portion integrated as a unique piece, the slot assembly contacting at one side of the extension frame and having a plurality of lateral slots parallel arranged in an axial direction, the alignment portion engaging the extension frame by buckling the gap, the position portion contacting an outer side of the extension frame by opposing to the slot assembly with respect to the gap; and
a plurality of winding rolls, fixed respectively into the corresponding lateral slots in a buckling manner.

2. The side winding motor stator of claim 1, wherein the stator tooth further has a winding portion, the stator structure further includes a winding coil wound around the winding portion, and the winding coil of the stator structure electrically couples the corresponding winding roll; wherein the sleeve portion covers the winding portion, and the winding coil winds the sleeve portion so as to wind around the winding portion.

3. The side winding motor stator of claim 2, wherein the winding roll further has a coupling portion for electrically coupling the corresponding winding coil.

4. The side winding motor stator of claim 2, wherein the outer frame further has at least one coil positioning aperture, the winding coil electrically coupling the winding roll via the coil positioning aperture.

* * * * *